US009360002B2

(12) United States Patent
Sassanelli et al.

(10) Patent No.: US 9,360,002 B2
(45) Date of Patent: Jun. 7, 2016

(54) SINGLE SYSTEM WITH INTEGRATED COMPRESSOR AND PUMP AND METHOD

(75) Inventors: Giuseppe Sassanelli, Florence (IT); Matteo Berti, Pontedera (IT); Lorenzo Bergamini, Bari (IT); Stefano Bresciani, Vaglia (IT); Marco DeIaco, Florence (IT); Nicola Banchi, Florence (IT)

(73) Assignee: Nuovo Pignone S.p.A., Florence (IT)

( * ) Notice: Subject to any disclaimer, the term of this patent is extended or adjusted under 35 U.S.C. 154(b) by 933 days.

(21) Appl. No.: 13/579,688

(22) PCT Filed: Feb. 11, 2011

(86) PCT No.: PCT/EP2011/052077
§ 371 (c)(1),
(2), (4) Date: Sep. 11, 2012

(87) PCT Pub. No.: WO2011/101296
PCT Pub. Date: Aug. 25, 2011

(65) Prior Publication Data
US 2013/0156543 A1    Jun. 20, 2013

(30) Foreign Application Priority Data

Feb. 17, 2010   (IT) ................ CO2010A0006

(51) Int. Cl.
*F04D 13/14*       (2006.01)
*F04B 41/06*       (2006.01)
(Continued)

(52) U.S. Cl.
CPC ............. *F04B 41/06* (2013.01); *F04D 13/14* (2013.01); *F04D 25/163* (2013.01);
(Continued)

(58) Field of Classification Search
CPC ......... F04D 31/00; F04D 13/12; F04D 13/14; F04D 13/028; F04D 25/16; F04D 25/163; F04D 17/12; F04D 29/5826; F04D 29/5833; F04D 29/5866; F04D 29/5873; F25J 3/0266; F25J 2230/20; F25J 2230/80; F25J 2235/80
USPC ............ 415/1, 122.1, 179, 176, 169.2–169.4; 417/243, 266, 423.5, 423.6
See application file for complete search history.

(56) References Cited

U.S. PATENT DOCUMENTS 3,001,692 A * 9/1961 Schierl ............................ 415/66
3,424,372 A * 1/1969 Blattner et al. ............... 415/104
(Continued)

FOREIGN PATENT DOCUMENTS

| CN | 1280252 A | 1/2001 |
|---|---|---|
| CN | 1442618 A | 9/2003 |

(Continued)

OTHER PUBLICATIONS

Inoue, JP 2010-266154 Englidh Machine Translation, translaed by Japan Platform for Patent Information on Jul. 9, 2015.*

(Continued)

*Primary Examiner* — Craig Kim
*Assistant Examiner* — Wayne A Lambert
(74) *Attorney, Agent, or Firm* — GE Global Patent Operation (57) ABSTRACT

Method and system for compressing a fluid in a gas phase and for pumping the fluid in a dense phase. The system includes a compressor part having an impeller; a compressor part inlet that receives the fluid in the gas phase; a compressor part outlet that provides the fluid in the gas phase; a temperature changing device that changes a phase of the fluid; a pump part having an impeller; a pump part inlet that receives the fluid in the dense phase from the compressor part outlet; a pump part outlet that outputs the fluid in the dense phase from the system; a single bull gear configured to rotate around an axial axis with a predetermined speed; plural pinions contacting the single gear bull and configured to rotate with predetermined speeds, and a pump shaft configured to rotate the at least one impeller of the pump part.

20 Claims, 7 Drawing Sheets

(51) Int. Cl.
  *F04D 25/16* (2006.01)
  *F04D 29/58* (2006.01)
  *F04D 31/00* (2006.01)
  *F25J 3/02* (2006.01)
  *B01D 53/26* (2006.01)

(52) U.S. Cl.
  CPC ........... *F04D 29/5826* (2013.01); *F04D 31/00* (2013.01); *F25J 3/0266* (2013.01); *B01D 53/265* (2013.01); *B01D 2256/22* (2013.01); *B01D 2257/80* (2013.01); *F25J 2230/20* (2013.01); *F25J 2230/80* (2013.01); *F25J 2235/80* (2013.01); *Y02C 10/12* (2013.01)

(56) References Cited

U.S. PATENT DOCUMENTS

| | | | |
|---|---|---|---|
| 3,477,239 A * | 11/1969 | Rische | 62/640 |
| 3,579,982 A * | 5/1971 | Strub | 60/667 |
| 3,592,078 A * | 7/1971 | Stark | 74/665 GD |
| 4,219,306 A * | 8/1980 | Fujino et al. | 415/62 |
| 4,299,536 A * | 11/1981 | Sieghartner et al. | 415/55.6 |
| 4,390,317 A * | 6/1983 | Lehmann et al. | 415/143 |
| 4,726,734 A * | 2/1988 | Zientek et al. | 415/143 |
| 4,747,749 A | 5/1988 | Sagnes | |
| 4,750,861 A * | 6/1988 | Baker | 415/134 |
| 5,154,571 A * | 10/1992 | Prumper | 415/60 |
| 5,382,132 A * | 1/1995 | Mendel | 415/60 |
| 5,664,935 A * | 9/1997 | Nishiuchi et al. | 415/90 |
| 5,901,579 A * | 5/1999 | Mahoney et al. | 62/646 |
| 6,171,074 B1 | 1/2001 | Charron | |
| 6,193,479 B1 | 2/2001 | Angoli | |
| 6,357,258 B1 * | 3/2002 | Mahoney | F25J 3/04024 62/643 |
| 6,393,865 B1 * | 5/2002 | Coakley | F25J 3/04018 62/643 |
| 6,484,533 B1 * | 11/2002 | Allam et al. | 62/643 |
| 6,547,514 B2 * | 4/2003 | Lee | 415/1 |
| 6,692,224 B2 * | 2/2004 | Miura et al. | 415/66 |
| 6,783,331 B2 * | 8/2004 | Lopes et al. | 417/216 |
| 7,490,594 B2 * | 2/2009 | Van Dyne et al. | 123/561 |
| 8,449,264 B2 * | 5/2013 | Schwarz | 417/53 |
| 8,512,440 B2 * | 8/2013 | Monk et al. | 95/39 |
| 8,601,833 B2 | 12/2013 | Dee et al. | |
| 2003/0123972 A1 * | 7/2003 | Quetel et al. | 415/1 |
| 2007/0166158 A1 * | 7/2007 | Kabir et al. | 415/232 |
| 2007/0189905 A1 * | 8/2007 | Dinsdale et al. | 417/2 |
| 2008/0008602 A1 * | 1/2008 | Pozivil et al. | 417/243 |
| 2009/0075219 A1 | 3/2009 | Vilagines et al. | |
| 2011/0008186 A1 * | 1/2011 | Palomba et al. | 417/247 |
| 2014/0069141 A1 * | 3/2014 | Yonemura et al. | 62/606 |

FOREIGN PATENT DOCUMENTS

| | | | |
|---|---|---|---|
| JP | 2003328998 A | | 11/2003 |
| JP | 2008057453 A | | 3/2008 |
| JP | 2009174844 A | | 8/2009 |
| JP | 2010266154 A | * | 11/2010 |
| WO | 2008009930 A2 | | 1/2008 |

OTHER PUBLICATIONS

Chihiro, JP 2008-057453 Englidh Machine Translation, translaed by Japan Platform for Patent Information on Jul. 8, 2015.*
Unofficial English Translation of Chinese Office Action and Search Report issued in connection with corresponding CN Application No. 201180019539.6 on Sep. 25, 2014.
Italian Search Report and Written Opinion dated Sep. 20, 2010 which was issued in connection with Italian Patent Application No. CO2010A000006 which was filed on Feb. 17, 2010.
International Search Report and Written Opinion dated Mar. 23, 2011 which was issued in connection with the PCT Patent Application No. EP11/052077 which was filed on Feb. 11, 2011.
Unofficial English Translation of Japanese Office Action issued in connection with corresponding JP Application No. 2012553271 on Mar. 10, 2015.

* cited by examiner

SINGLE SYSTEM WITH INTEGRATED COMPRESSOR AND PUMP AND METHOD

CROSS REFERENCE TO RELATED APPLICATIONS

This is a national stage application under 35 U.S.C. §371 (c) prior-filed, co-pending PCT patent application serial number PCT/EP2011/052077, filed on Feb. 11, 2011, which claims priority to Italian Patent Application No. CO2010A000006, filed on Feb. 17, 2010, the entire contents of which are incorporated herein by reference.

BACKGROUND OF THE INVENTION

Embodiments of the subject matter disclosed herein generally relate to methods and systems and, more particularly, to mechanisms and techniques for integrating a compressor part and a pump part in a single system for compressing and pumping a given fluid.

During the past years the increased reliance on petrochemical products has generated not only a large increase in pollutant (e.g., $CO_2$) emissions but also a need to have more compressors, pumps and other machinery that are used for processing oil and gas derivative products.

For example, in the field of Power Generation a large amount of $CO_2$ emissions are produced. As the world is becoming more sensitive to the polluting emissions and the governments are moving towards a system that penalizes these emissions into the environment, it is more acute than ever to develop technologies that reduce the amount of pollution, the so-called green technologies. In a different field, Enhanced Oil Recovery (EOR, which refers to techniques for increasing the amount of crude oil that can be extracted from an oil field) the need for transporting $CO_2$ and/or a $CO_2$ mixture in a more efficient and reliable way is also important for the industry and for the environment. According to EOR, $CO_2$ and/or $CO_2$ mixture from a storage facility is provided to a drilling location, either onshore or offshore for being pumped underground for removing the oil. As such, the transportation of $CO_2$ and/or $CO_2$ mixture is important for this field. With regard to power generation, the reduction of $CO_2$ emissions is challenging as this fluid has a high molecular weight and its critical point is at a very low pressure (74 bar) at ambient temperature. In order to remove the $CO_2$ that is usually produced as a gas by power generation, the $CO_2$ needs to be separated from the other pollutants and/or substances that are present in the exhaust from the power plant. This step is traditionally called capture. After capturing the $CO_2$, the gas needs to be compressed to arrive at a predetermined pressure, cooled down to change from gas phase to a dense phase, e.g., liquid phase, and then transported in this denser phase to a storage location. As will be discussed later, the dense phase depends on the type of fluid, the amount of impurities in the fluid and other parameters. However, there is no unique parameter that can quantitatively describe the dense phase for a fluid in general, unless an accurate composition of the fluid is known. The same process may be used for EOR, where the $CO_2$ and/or $CO_2$ mixture needs to be captured and then compressed and transported to the desired location for reinjection.

Thus, conventionally, after the capturing phase, a compressor is used to bring the initial $CO_2$ in the gas phase to a dense phase or a liquid phase. Afterwards, the $CO_2$ is feed to a pump that transports the fluid in the dense or liquid phase to a storage facility or to another desired location for reinjection. It is noted that for both the pump and the compressor to efficiently process the $CO_2$, certain pressures and temperatures of the $CO_2$ in the gas and dense/liquid phases have to be achieved as the efficiencies of the compressor and pump are sensitive to them. Therefore, traditional compressors and pumps need to be fine-tuned with respect to each other such that the precise phase of $CO_2$ is transferred from the compressor to the pump. However, as the compressor and pump are traditionally manufactured by different providers, the matching of these two elements may be time intensive, requiring a lot of coordination between the manufacturers. Further, the existent systems that use standalone compressors and standalone pumps have a large footprint, which may be expensive.

Accordingly, it would be desirable to provide systems and methods that avoid the afore-described problems and drawbacks.

BRIEF SUMMARY OF THE INVENTION

According to an embodiment of the present invention, there is a system for compressing a fluid in a gas phase and for pumping the fluid in a dense phase. The system includes a compressor part having at least one impeller configured to compress the fluid in the gas phase; a compressor part inlet connected to the compressor part and configured to receive the fluid in the gas phase and to provide the fluid to the at least one impeller; a compressor part outlet configured to provide the fluid in the gas phase at a density equal to or larger than a predetermined density; a temperature changing device connected to the compressor part outlet and configured to change the fluid to the dense phase; a pump part having at least one impeller configured to pump the fluid in the dense phase; a pump part inlet configured to receive the fluid in the dense phase from the compressor part outlet; a pump part outlet configured to output the fluid in the dense phase from the system; a single bull gear configured to rotate around an axial axis with a predetermined speed; plural pinions contacting the single bull gear and configured to rotate with predetermined speeds, different from each other, each pinion being configured to activate a corresponding compressor part impeller, and a pump shaft extending from the pump part and configured to engage the single bull gear to rotate the at least one impeller of the pump part. The at least one impeller of the compressor part has a different speed than the at least one impeller of the pump part, and the dense phase is defined by having a density larger than the predetermined density.

According to an embodiment of the present invention, there is a method for compressing a fluid in a gas phase and for pumping the fluid in a dense phase with a system including a compressor part and a pump part, the compressor part having at least one compressor part impeller and the pump part having at least one pump part impeller. The method includes receiving at a compressor part inlet of the compressor part the fluid in the gas phase; compressing the fluid in the gas phase in one or more stages of the compressor part such that the fluid emerges at a compressor part outlet of the compressor part as a fluid in the gas phase at a density equal to or larger than a predetermined density; transforming a phase of the fluid to the dense phase by cooling the fluid after exiting the compressor part; receiving the fluid in the dense phase at a pump part inlet of the pump part; pumping the fluid in the dense phase through one or more stages of the pump part such that the fluid emerges at a pump part outlet of the pump part having a higher pressure than at the pump part inlet; and rotating a single bull gear in order to activate all of the at least one or more compressor stages and the at least one or more pump stages. The dense phase is defined by the fluid having a density larger than the predetermined density.

According to an embodiment of the present invention, there is a computer readable medium including computer executable instructions, wherein the instructions, when executed, implement a method for compressing a fluid in a gas phase and for pumping the fluid in a dense phase with a system including a compressor part and a pump part, the compressor part having at least one compressor part impeller and the pump part having at least one pump part impeller. The method includes the steps recited in the previous paragraph.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION OF EXEMPLARY EMBODIMENTS OF THE INVENTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a compressor and pump used for $CO_2$. However, the embodiments to be discussed next are not limited to this fluid, but may be applied to other fluids.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a single system that includes a compressor part and a pump part. The single system is configured to take as input a fluid in a gas phase, transform it to a fluid in a dense phase (or liquid phase) and transport the fluid in the dense phase to a desired location. The dense phase may be defined by a density, pressure and temperature of the fluid. The density, which is predetermined for each fluid, depends, among other things, on the composition of the fluid. It is noted that the fluid in the dense phase may be a gas but so dense that behaves like a liquid when pumped. For this reason, it is desired to supply the fluid in the dense phase or the liquid phase to the pump part. The system may have a single bull gear that drives both the compressor part and the pump part. Such a system may have a smaller footprint than a traditional system that includes a standalone compressor and a standalone pump as both the compressor stages and the pump stages are formed around the bull gear. The system may also use less power than the standalone compressor and the standalone pump. The system may use one or more cooling devices provided, for example, between the compressor part and the pump part for cooling the fluid in the gas phase from the compressor to achieve the dense phase prior to the same being supplied to the pump part. Other cooling devices may be optionally installed between the various stages of the compressor part and/or pump part. According to an exemplary embodiment illustrated in FIG. 1, an integrated system 10 includes a compressor part 12 and a pump part 14. The compressor part 12 is housed in a casing 16. Inside the casing 16 there is a gear box 18 that includes, among other things, a single bull gear 20 and one or more pinions 22. In one application, the gear box 18 may be provided outside casing 16. Each pinion 22 may be attached to a corresponding shaft 24 that is connected to a corresponding compressor impeller. A shaft 23 is connected with one end to the bull gear 20, either directly or via one or more pinions 25 or other equivalent mechanisms and the other end of the shaft 23 enters the pump part 14 for activating the one or more stages present in the pump part. A gear 26 may be provided between the bull gear 20 and one or more of the pinions 22. According to an exemplary embodiment, the stages of the compressor part are distributed around the bull gear 20 like spikes around a hub of a wheel while the stages of the pump part 14 are distributed in line, along the shaft 23 as shown later, which is different from an inline arrangement, in which the stages of the compressor and pump are all distributed along a common shaft. Another difference between the arrangement shown in FIG. 1 and an inline arrangement is that the stages of the system 10 may have their own rotational speed while the stages in the inline arrangement all have a single rotational speed.

Figure 1:
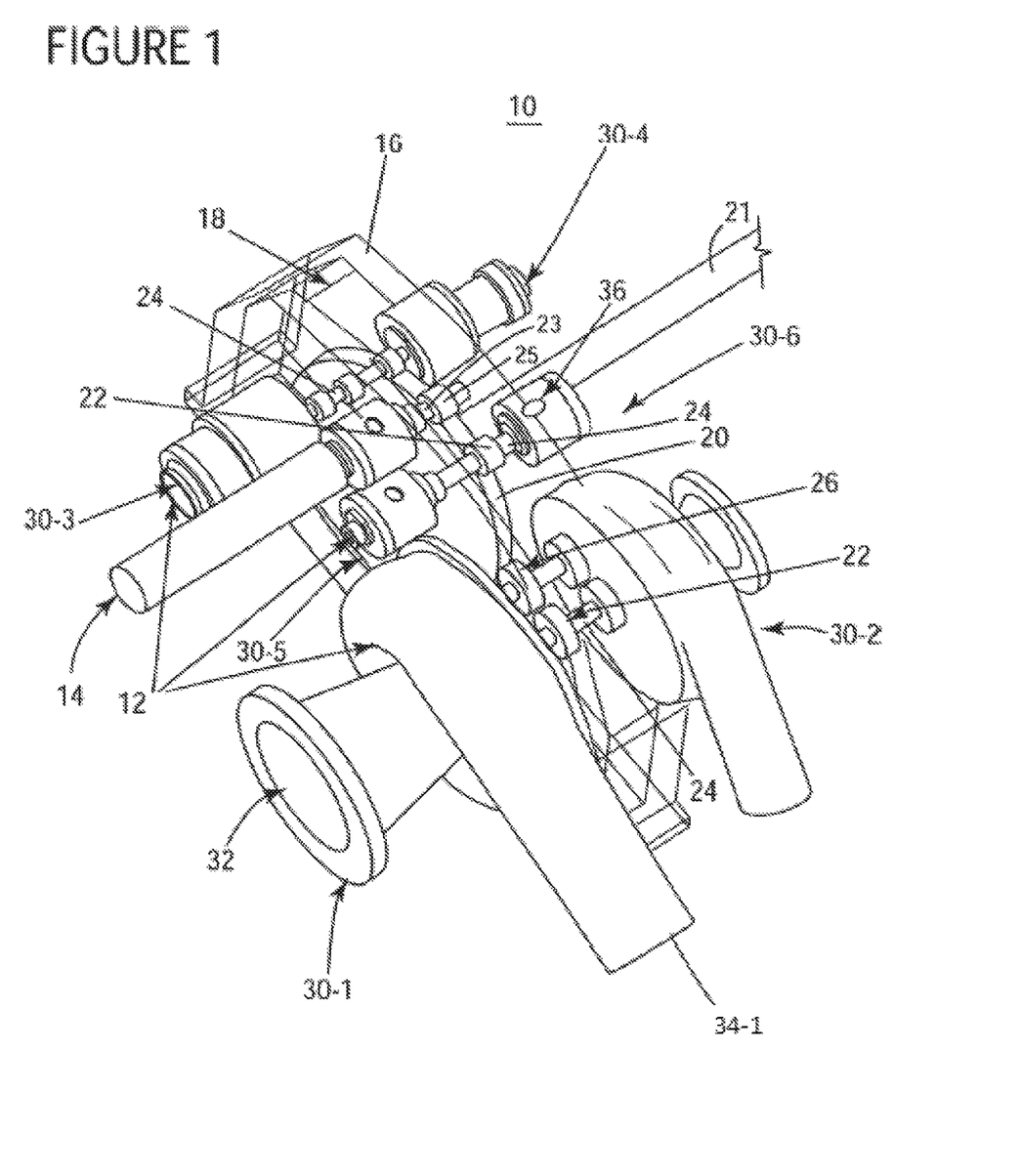
FIG. 1 is a general view of a system having an integrated compressor and pump according to an embodiment of the present invention.

The compressor part 12 may include multiple stages, e.g., multiple impellers that drive the desired fluid. In one application, the compressor part 12 is a centrifugal compressor and the number of compressor impellers and correspondingly compressor stages may be one or more. According to an exemplary embodiment, the compressor impellers are selected to accelerate the flowing fluid due to a centrifugal force, so that the compressor part 12 acts as a centrifugal compressor. For example, the embodiment shown in FIG. 1 shows six stages 30-1 to 30-6, each having a corresponding compressor impeller. Each stage has an inlet and an outlet. The compressor part 12 has an overall compressor part inlet 32 and an overall compressor part outlet 35. The compressor part inlet 32 is configured to receive the fluid in the gas phase and the compressor part overall outlet 35 is configured to provide the fluid in the gas phase at an increased pressure and/or density. For example, the input pressure may be 1 bar while the output pressure may be between 10 to 1000 bar. In one application, the output pressure may be between 10 and 120 bar. The output density may be between 100 and 500 kg/m³ for $CO_2$ having a relative low impurity content, between 0 and 5%. The pump part 14 may also include one or multiple stages, e.g., multiple impellers that drive the fluid in the dense or liquid phase. Each stage may have an inlet and an outlet. The pump part 14 has an overall pump part inlet and a pump part outlet (shown later). The pump part inlet may be configured to be connected to the overall compressor part outlet 35 to receive the fluid in the dense phase from the compressor part. The pump part outlet may be configured to discharge the fluid in the dense phase at a desired pressure for transportation, for example, to a storage location. For the $CO_2$ having the impurity noted above, a density between 400 and 800 kg/m³ is the predetermined density that characterizes the dense phase. In other words, for this particular purity of $CO_2$, if the density of the fluid is around or larger than 400 to 800 kg/m³ and the temperature and pressure of the fluid are above the critical values, then the fluid is considered to be in the dense phase. As already noted above, this value is correct for a particular purity of $CO_2$ and thus, this value changes with the nature of the fluid and its purity.

The pump part shown in FIG. 1 has the shaft 23 extending inside housing 16 of the compressor part 12 such that the bull gear 20 activates the shaft 23. Thus, the rotation of the bull gear 20 (by a shaft 21) determines not only the rotation of the compressor stages' pinions but also the rotation of the pump shaft 23 and thus, the rotation of the pump part impellers. In one application, another mechanism may be used instead of the bull gear for activating the compressor's stages and the pump's stages. It is noted that while the bull gear 20 may rotate with a given speed, each compressor impeller may rotate with a different speed depending on the size of the corresponding pinion. However, the pump impellers are distributed inline, e.g., the pump part impellers have a same speed. In other words, by using a single bull gear, the various stages of the compressor part and the pump part may be designed such that the single system receives as input a fluid in a gas phase and output the fluid in a dense phase or liquid phase.

Figure 2:
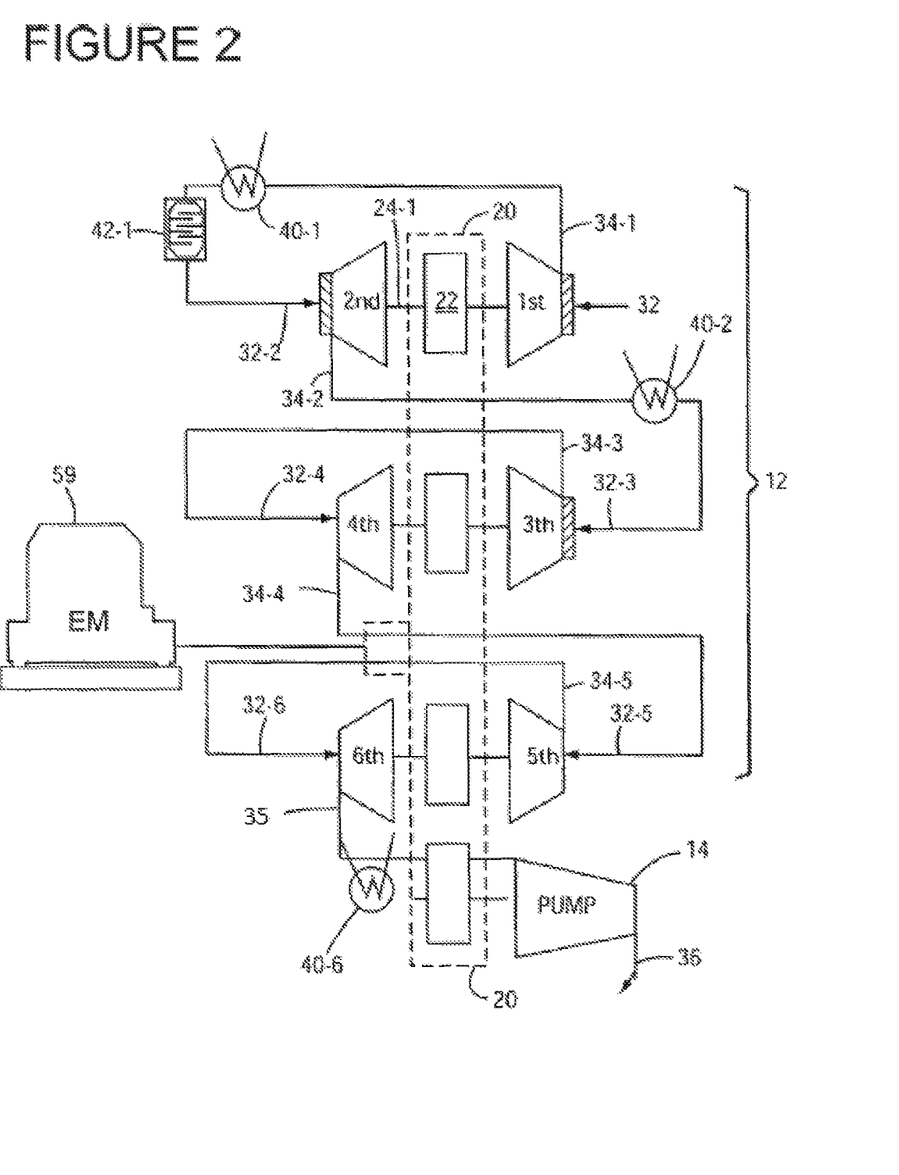
FIG. 2 is a schematic diagram of a system having an integrated compressor and pump according to an embodiment of the present invention.

According to an exemplary embodiment, connections among the various compressor part and pump part inlets and outlets are shown in FIG. 2.

Compressor part 12 includes six stages in this embodiment. However, as discussed above, this number is exemplary and the compressor part may include more or less stages as necessary for each application. The overall inlet 32 and the overall outlet 35 of the compressor part 12 have been shown in FIG. 1.

FIG. 2 shows the inlets and outlets between the different stages of the compressor part 12. For example, after the fluid in the gas phase enters overall inlet 32, the $1^{st}$ stage discharges the fluid, still in the gas phase, at outlet 34-1. It is noted that outlet 34-1 is the outlet of the $1^{st}$ stage while overall outlet 35 is the outlet of the last stage and the overall outlet of the compressor part 12. The fluid in the gas phase, having an increased pressure and temperature at outlet 34-1, may be provided to a temperature cooling device 40-1 for reducing a temperature of the fluid in the gas phase. The number of cooling devices used between different stages of the compressor part may vary from application to application. The cooling device may be a cooler (a cooler is a device that circulates water or other media at a desired temperature around a liquid to remove heat from the liquid), a chiller (a chiller is a machine that removes heat from a liquid via a vapor-compression or absorption refrigeration cycle) or an expander (a device that is capable of expanding a gas producing mechanical torque, also called a Joule-Thomson valve).

Figure 3:
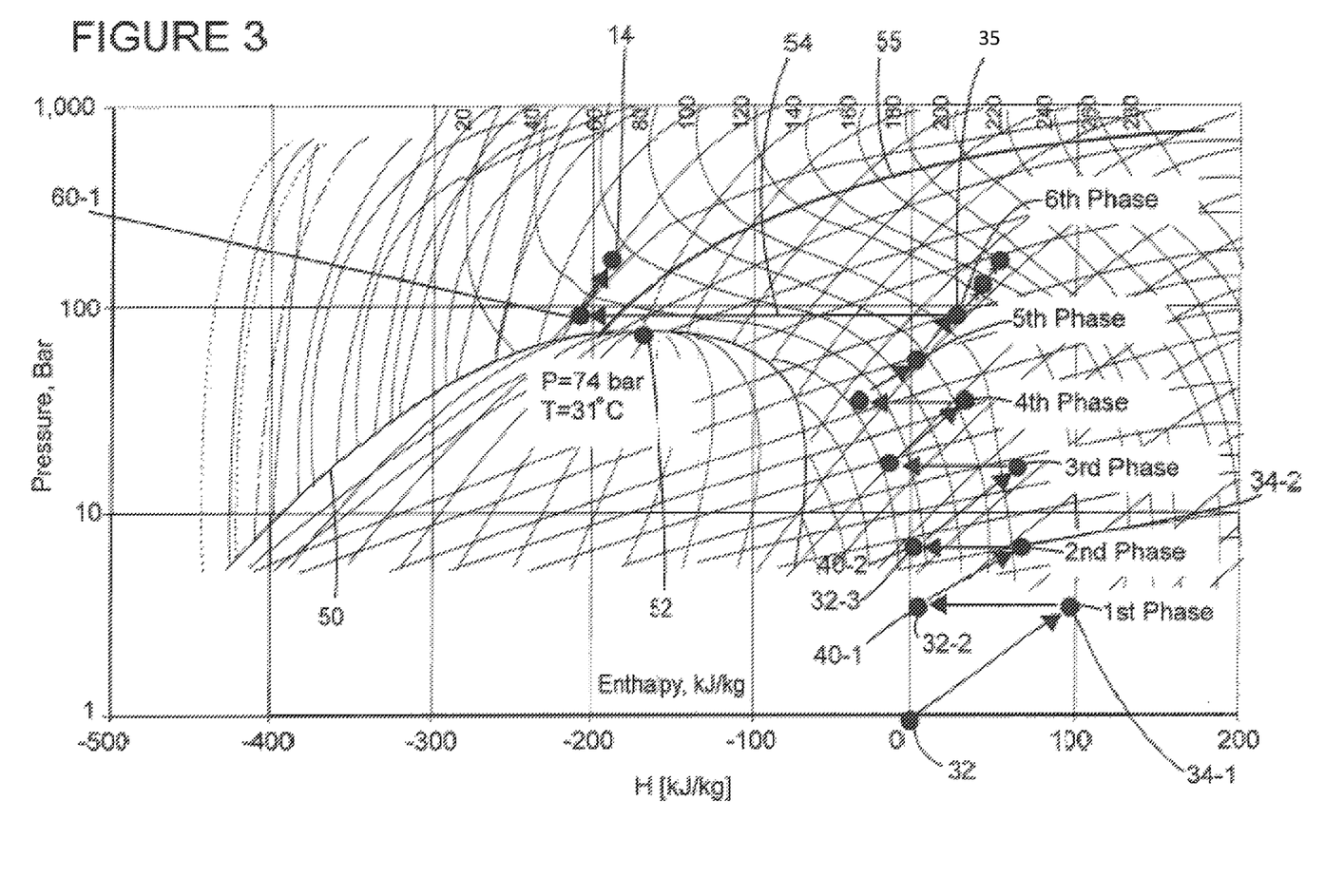
FIG. 3 illustrates a phase diagram of a fluid that is compressed by the compressor and pumped by the pump at certain temperatures and pressures according to an embodiment of the present invention.

FIG. 3 illustrates the process of FIG. 2 on a pressure-enthalpy or Ph diagram. Also included in the Ph diagram are lines of constant temperature. The lines of constant temperature are identified by corresponding temperatures. For example, FIG. 3 shows that the temperature is around 25° C. and the pressure is around 1 bar at inlet 32 and the temperature has risen to around 120° C. and the pressure to around 5 bar at the outlet 34-1 of the first stage. The numbers shown in FIG. 3 are for explanatory purposes and are not intended to limit the applicability of the discussed embodiments. For simplicity, the reference numbers used for the inlets and outlets in FIG. 2 are also used in FIG. 3 to show their corresponding temperatures and pressures. Still with regard to FIG. 3, the cooling device 40-1 may reduce the temperature of the fluid after the first stage from about 120° C. to about 25° C. prior to entering the inlet 32-2 of the second stage. A separator device 42-1 may be connected between the outlet 34-1 of the first stage and the inlet 32-2 of the second stage to remove water (or other liquids) from the compressed $CO_2$ fluid. The number of separator devices may vary from one between each two adjacent stages to zero depending on the application. The second stage expels the fluid still in the gas phase at outlet 34-2, and after passing through an optional second temperature cooling device 40-2, the gas arrives at the inlet 32-3 of the third stage. The fluid in the gas phase continues to pass from stage to stage, e.g., through elements 34-3, 32-4, 34-4, 32-5, 34-5, and 32-6 until the fluid in the gas phase exits the overall outlet 35 at a high pressure. FIG. 3 shows that the temperatures and pressures of the fluid in the gas phase are maintained close to but outside of the dome 50. According to an exemplary embodiment, the compressor part 12 may be designed to process a fluid in the gas phase by preventing the fluid from entering the dome 50, as this may result in loss of compressor performance or even damage thereto.

A critical point 52 of the fluid, in this case $CO_2$, is shown on top of the dome 50 and its exemplary reference pressure and temperature values are listed in FIG. 3. A critical point is a point at which boundaries between phases of the fluid ceases to exist. Points having pressures and temperatures higher than the critical point form a supercritical phase. According to an exemplary embodiment, the dense phase is the supercritical phase. However, as discussed later, the dense phase may include points that form a subset of the points of the supercritical phase. The fluid in the gas phase leaving the compressor part 12 and having the highest pressure (in the compressor) is achieved at point 35 in FIG. 3 and this fluid is then provided to an inlet 60-1 of the pump part 14. It is noted that the pump part is designed to work with a fluid in the dense or liquid phase and not in the gas phase and thus, the fluid in the gas phase from the compressor part 12 has to be further processed to reach the dense or liquid phase.

The process of transforming the fluid from the gas phase to the dense phase is a function of the speed of each compressor stage, the temperature and pressure of the fluid at each stage and of the coordination of the temperatures and pressures of the fluid relative to the dome 50. FIG. 3 shows how a temperature after each compressor stage may be adjusted (lowered) for the next compressor stage to increase the efficiency of the compressor while reducing the amount of compressor work needed and also how the temperature of the fluid in the gas phase at the overall outlet of the compressor part 12 is cooled to an appropriate temperature to change its phase for the inlet of the pump part 14. According to an exemplary embodiment, the phase transition from the gas phase to the dense phase takes place along leg 54, e.g., at cooling device 40-6, between the compressor part 12 and the pump part 14. In one application, a temperature of the fluid is changed such that an enthalpy of the fluid that is provided to the pump part is equal to or lower than the enthalpy at the critical point 52, as shown in FIG. 3. FIG. 3 shows a constant-density line 55 corresponding to a predetermined density for the $CO_2$ fluid. As discussed above, the compressed fluid in the gas phase needs to cross curve 55 for entering the dense phase. As an example, for a purity of $CO_2$ equal to or larger than 95%, the predetermined density curve 55 is characterized by a constant density in the range of 400 to 800 kg/m3. The predetermined density may change depending on the application, the characteristics of the pump, the type of fluid, the impurity of the fluid, the environment, etc. According to an exemplary embodiment, the dense phase includes only those points present in the supercritical phase that have the density larger than the predetermined density.

FIG. 2 shows that the temperature cooling device 40-6 may be inserted between the last stage of the compressor part 12 and the first stage of the pump part 14 to control a temperature of the fluid while changing from the gas phase to the dense phase. This feature allows the operator of the pump part to fine tune that temperature as the pump inlet pressure depends on the fluid inlet temperature for a given pressure and also the pump inlet pressure determines the required power to drive the pump. While the pressure of the fluid to be provided to the pump part is controlled by the compressor part 12, the temperature of the fluid to be provided to the pump part is controlled by the cooling device 40-6.

Further, FIG. 2 schematically shows that the stages of the compressor part may be paired, e.g., 1st stage paired with the 2nd stage to have a single shaft 24-1 that is rotated by a corresponding pinion that is in contact with the bull gear 20. Furthermore, FIG. 2 shows that the bull gear 20 may transfer rotational motion to all the pinions of the compressor part 12 and to all stages of the pump part 14. In addition, FIG. 2 shows that one drive 59 drives the bull gear 20 and the drive 59 may be placed outside the casing that houses the compressor part. FIG. 2 also shows that the pump part 14 is driven by the same bull gear 20.

Figure 4:
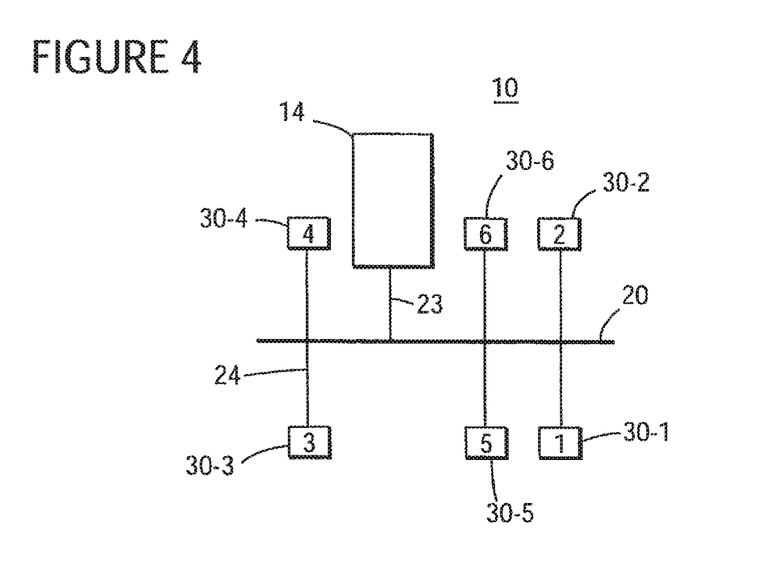
FIG. 4 is a schematic diagram of a pump part connected to a bull gear that activates a compressor part according to an embodiment of the present invention.
Figure 5:
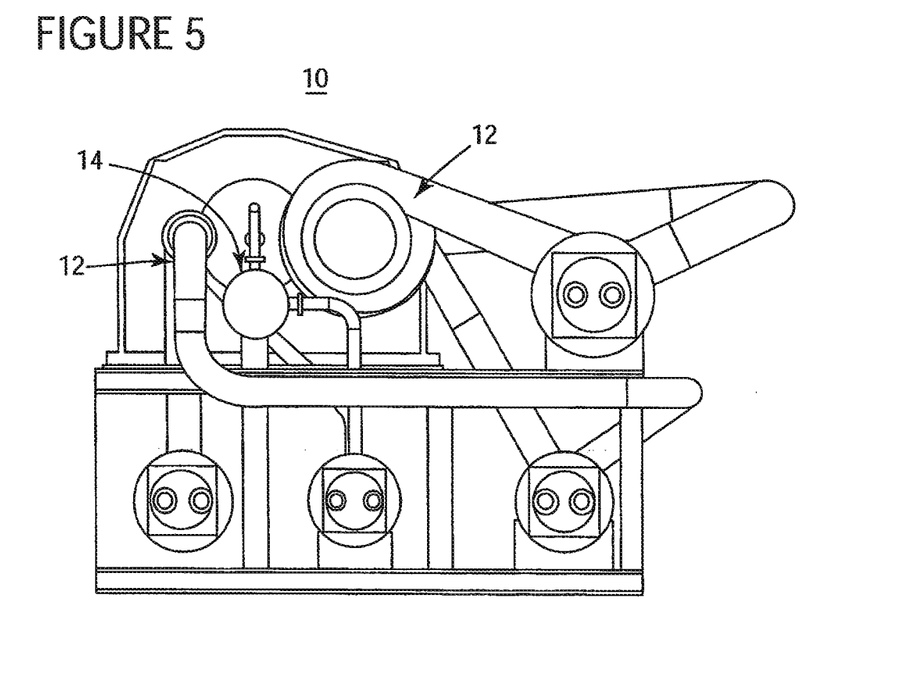
FIG. 5 is a side view of a system having the integrated compressor and pump according to an embodiment of the present invention.

According to an exemplary embodiment, the connections among the stages of the compressor part and the pump part to the bull gear 20 are illustrated in FIG. 4, which is a schematic view of system 10. FIG. 4 shows the compressor part 12 having six stages 30-1 to 30-6, each connected to the bull gear 20 and the pump part 14 having a single shaft 23 connected to the bull gear 20. FIG. 5 illustrates piping connections among the compressor pump stages and the pump part from a side opposite to the driver 59. The reference numbers from FIG. 1 are used in FIGS. 4 and 5 for the same elements, and thus, a description of these elements is not repeated herein. Driver 59 may be an electric motor, a gas turbine, a turbo machinery, etc. According to an exemplary embodiment, only one driver is used to drive both the compressor part and the pump part. In another exemplary embodiment, the driver may be provided outside a casing that accommodates the compressor part and the pump part or inside that casing.

Figure 6:
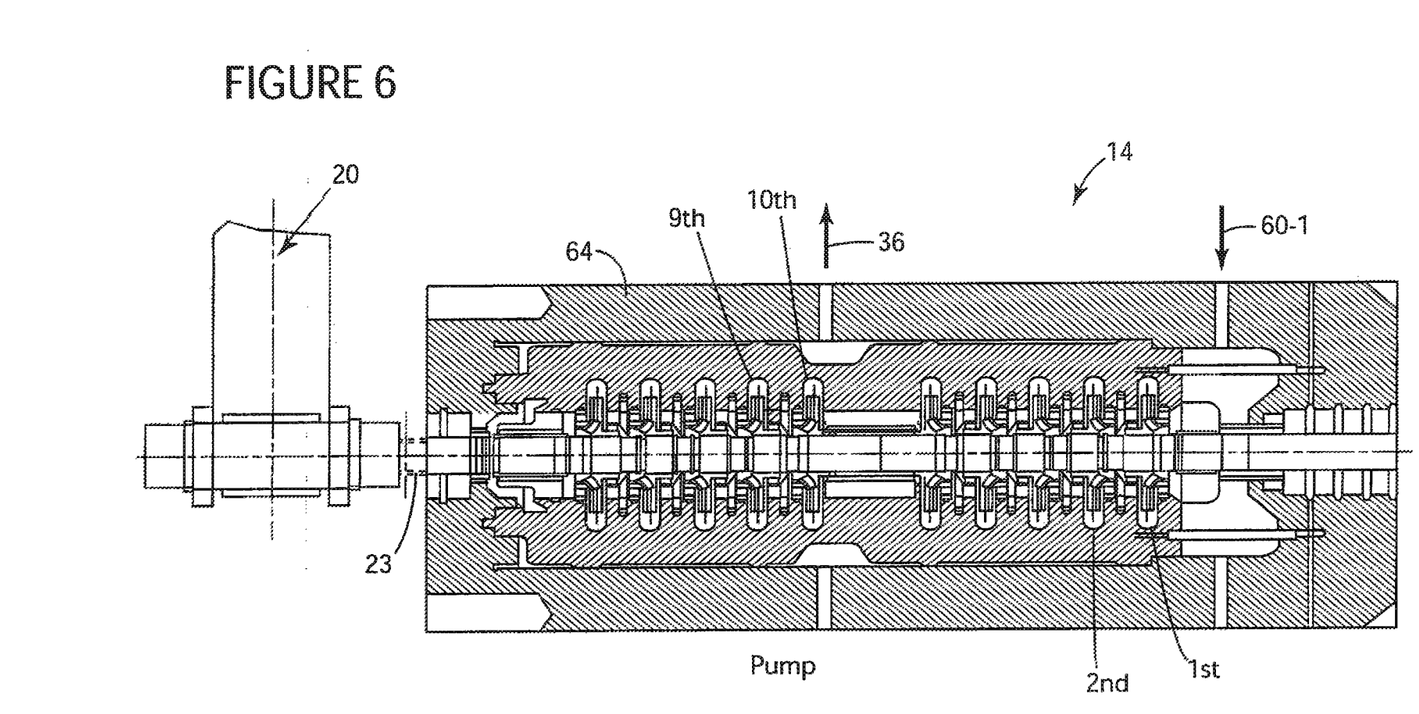
FIG. 6 is a schematic diagram of a pump part of the system according to an embodiment of the present invention.

The pump part 14 may be implemented, according to an exemplary embodiment shown in FIG. 6, to have ten stages. More or less stages may be implemented depending on the application. The first stage has an inlet 60-1 that receives the fluid in the dense phase and an outlet (not labeled) that discharges the fluid to the second stage. The inlet of the second stage receives the fluid from the first stage and the second stage discharges the fluid to the next stage until the fluid arrives at the overall outlet 36 of the tenth stage, which is also the overall outlet of the pump part 14. It is noted that according to an exemplary embodiment, the pump part impellers are connected to the same shaft 23 and thus, they rotate with a same speed. The speed of the pump part impellers relative to the speed of the bull gear 20 is determined by the size of a connecting pinion 25. According to other exemplary embodiments, the pump has at least eight stages. In addition, the pump part may include other devices, e.g., cooling devices for reducing a temperature of the fluid in the dense phase. The pump part is housed in a pump casing 64. The pump casing 64 may be attached (bolted) to or may be made integrally with the compressor casing 16. The gear box 18 may be placed in the compressor casing 16, in the pump casing 64, between the two casings, or in both casings.

By having the compressor part and the pump part integrated in the same system and/or the same skid and also having a single bull gear that drives the various stages of the compressor and the pump, one or more embodiments may have the advantage that the system operator does not need to custom order the compressor and pump to match the output of the compressor to the input of the pump for having a smooth transition of the fluid in the gas phase from the compressor to the fluid in the dense or liquid phase at the pump. In other words, by having a single manufacturer of both the compressor part and the pump part that match the performance of the compressor and the pump so as to efficiently handle a specific fluid, for example, $CO_2$, the operator of the system is relieved of the problem of correctly matching a compressor manufactured by a first provider to a pump manufactured by a second provider for a specific fluid.

Other advantages of one or more embodiments are related to the reduced power used by the integrated compressor and pump parts, the simplicity of the driving mechanism, the reduction in components (e.g., one drive instead of two drives), the improved synchronization of the compressor part with the pump part as both parts are driven by the same gear, the reduced footprint of the integrated system, and the reduced maintenance time and cost as both parts are serviced by the same manufacturer.

Figure 7:
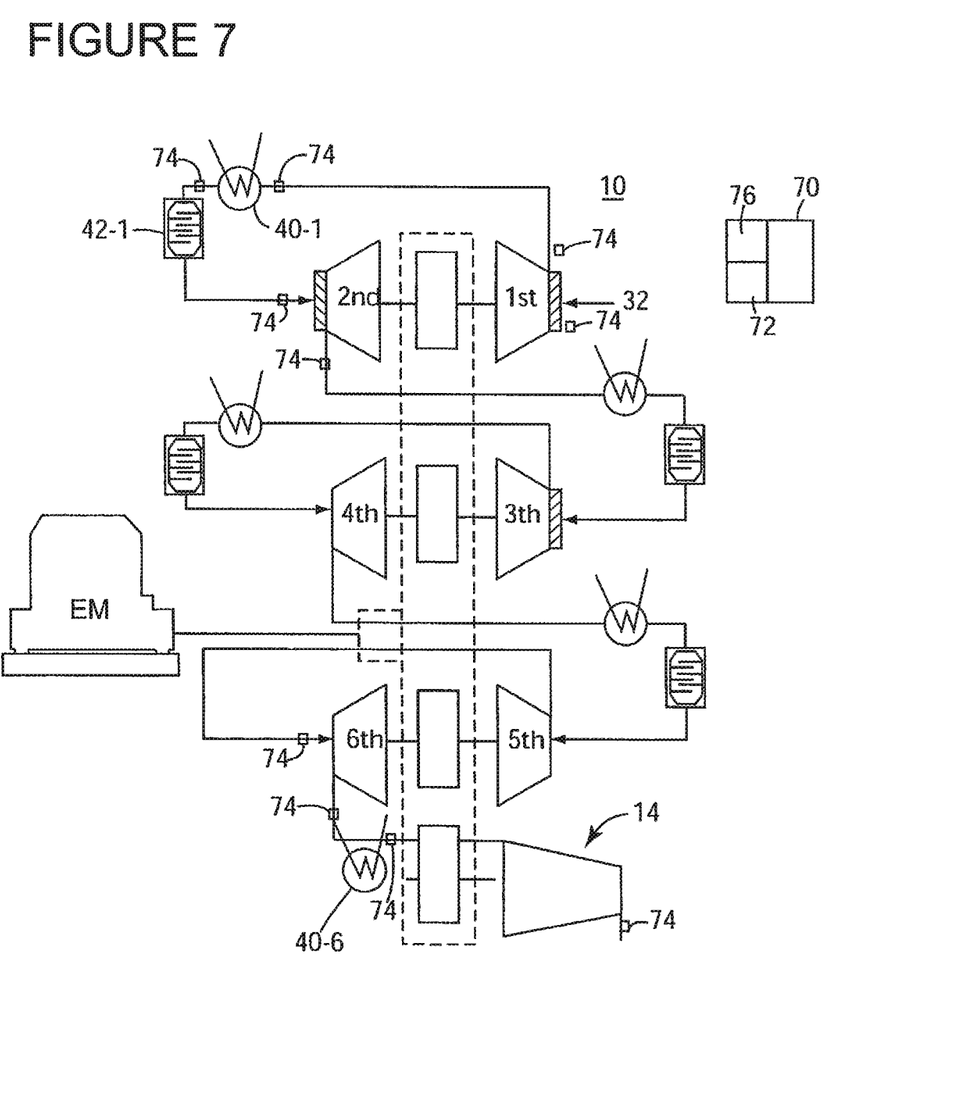
FIG. 7 is a schematic diagram of a system having an integrated compressor and pump and a control system according to an embodiment of the present invention.

According to an exemplary embodiment, the temperature control of the fluid at different stages in the compressor part and/or the pump part may be achieved by a processor incorporated in a control device. As shown for example in FIG. 7, the control unit 70 includes at least a processor 72 and the control unit is connected to various sensors 74 provided in the system 10. The connection may be wireless, as shown in FIG. 7, hard wired, or a combination thereof. The sensors 74 may include temperature sensors, pressure sensors, speed sensors for the bull gear, and other sensors that are known to be used in the art for monitoring the compressor part and the pump part. The control unit 70 may be programmed with software instructions or may be implemented in hardware to monitor the pressures and temperatures of the compressor and pump stages and to control the cooling devices to cool the fluid to a desired temperature. According to an exemplary embodiment, a look-up table or a graph as shown in FIG. 3 may be stored in a memory 76 that is linked to processor 72 such that the processor 72 may determine at what temperature to cool the fluid based on the location of the fluid in the system 10, the speed of the bull gear, and/or the pressure of the fluid. In addition, the processor 72 may control the system 10 such that the fluid in the compressor part and in the pump part does not reach the area under dome 50 indicated in FIG. 3. Also, the processor 72 may be configured to change the phase of the fluid prior to entering the pump part.

Figure 8:
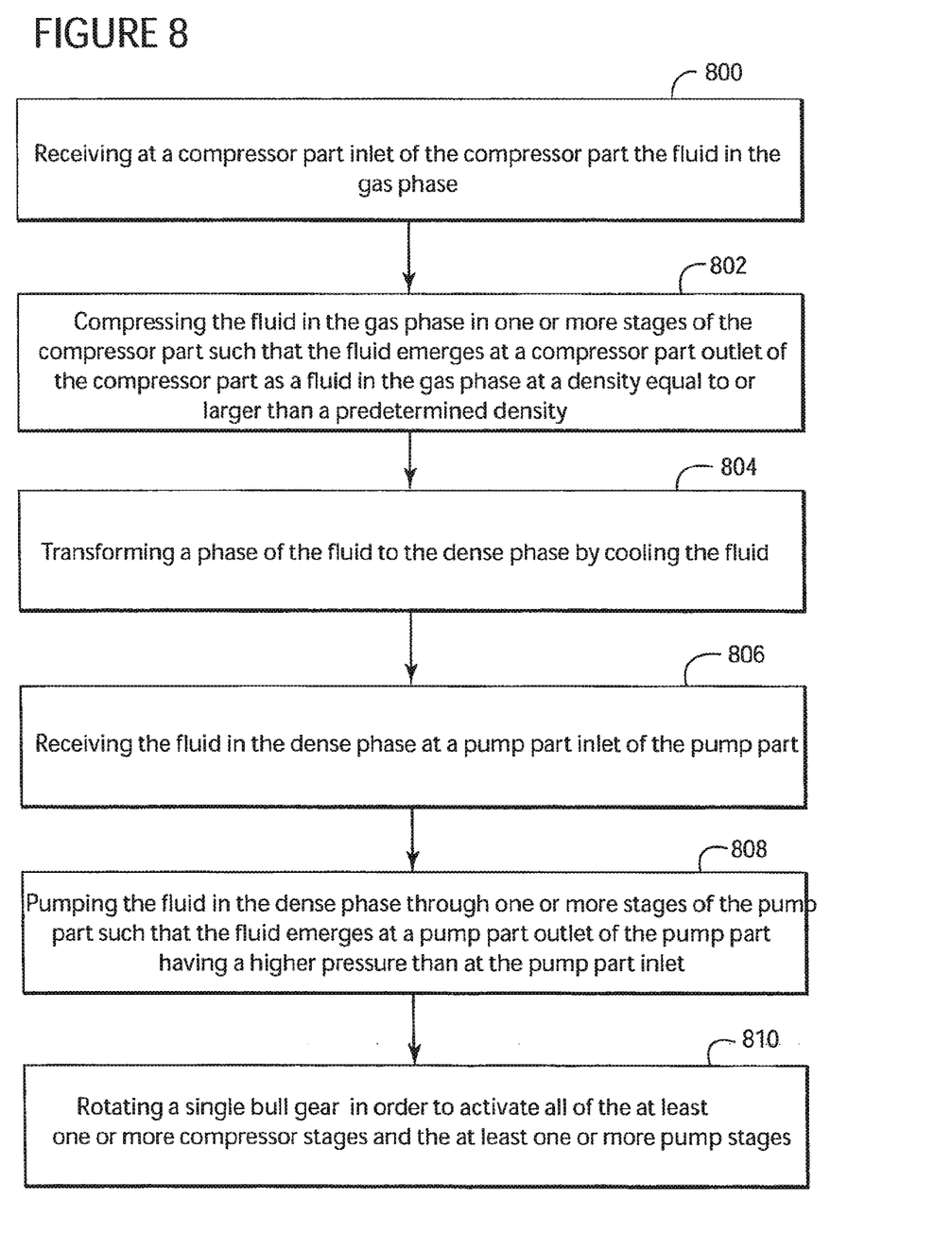
FIG. 8 is a flow chart illustrating a method for compressing and transporting a fluid according to an embodiment of the present invention.

According to an exemplary embodiment illustrated in FIG. 8, there is a method for compressing a fluid in a gas phase and for pumping the fluid in a dense phase with a system including a compressor part and a pump part, the compressor part having at least one compressor part impeller and the pump part having at least one pump part impeller. The method includes a step 800 of receiving at a compressor part inlet of the compressor part the fluid in the gas phase, a step 802 of pushing the fluid in the gas phase through one or more stages of the compressor part such that the fluid emerges at a compressor part outlet of the compressor part as a fluid in the gas phase at an increased density, a step 804 of transforming a phase of the fluid to the dense phase, a step 806 of receiving the fluid in the dense phase at a pump part inlet of the pump part, a step 808 of driving the fluid in the dense phase through one or more stages of the pump part such that the fluid emerges at a pump part outlet of the pump part having a higher pressure than at the pump part inlet, and a step 810 of rotating a single bull gear in order to activate all of the at least one or more compressor stages and the at least one or more pump stages. The dense phase is defined by the fluid having a density larger than the increased density.

The disclosed exemplary embodiments provide a system and a method for compressing a fluid in a gas phase and transporting the fluid in a dense or liquid phase. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein. This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A system configured to compress a fluid in a gas phase and to pump the fluid in a dense phase, the system comprising:
   a compressor part comprising at least one impeller configured to compress the fluid in the gas phase;
   a compressor part inlet connected to the compressor part and configured to receive the fluid in the gas phase and to provide the fluid to the at least one impeller;
   a compressor part outlet configured to provide the fluid in the gas phase at a density equal to or larger than a predetermined density;
   a temperature changing device connected to the compressor part outlet and configured to change the fluid to the dense phase;
   a pump part comprising at least one impeller configured to pump the fluid in the dense phase;
   a pump part inlet configured to receive the fluid in the dense phase from the compressor part outlet;
   a pump part outlet configured to output the fluid in the dense phase from the system;
   a single bull gear configured to rotate around an axial axis with a predetermined speed;
   plural pinions contacting the single gear bull and configured to rotate with predetermined speeds, different from each other, each pinion being configured to activate a corresponding compressor part impeller; and
   a pump shaft extending from the pump part and configured to engage the single bull gear to rotate the at least one impeller of the pump part,
   wherein the at least one impeller of the compressor part has a different speed than the at least one impeller of the pump part, and the dense phase is defined b - the fluid having a density larger than the predetermined density.

2. The system of claim 1, wherein the temperature changing device is one of a cooling device, a chiller, or an expander and is provided between the compressor part outlet and the pump part inlet, the fluid is $CO_2$, the compressor part is configured to receive the $CO_2$ in the gas phase and to drive out the $CO_2$ in the gas phase, and the pump part is configured to receive the $CO_2$ in the dense phase and to drive out the $CO_2$ in the dense phase.

3. The system of claim 1, wherein the temperature changing device is configured to reduce an enthalpy of the fluid in the gas phase to be equal to or lower than an enthalpy of a critical point of the fluid.

4. The system of claim 1, further comprising:
   a single drive mechanism that drives the bull gear.

5. The system of claim 1, further comprising:
   a compressor casing configured to house the compressor part and the bull gear; and
   a pump casing configured to receive the pump part, wherein the pump casing is attached to the compressor casing.

6. The system of claim 1, wherein the system is configured to handle only one fluid with a predetermined efficiency and the system cannot be reconfigured to handle another fluid with the same efficiency.

7. The system of claim 1, wherein the at least one impeller of the compressor part and the at least one impeller of the pump part comprise:
   first to sixth compressor impellers configured such that the first and second compressor impellers are driven at a same first speed, the third and fourth compressor impellers are driven at a same second speed, and the fifth and sixth compressor impellers are driven at a same third speed, the first, second and third speeds being different from each other and from the speed of the bull gear; and
   first to ten pump impellers configured to be driven at a same fourth speed by the pump shaft.

8. The system of claim 1, further comprising:
   N compressor impellers and M pump impellers;
   piping connecting outputs and inputs of the N compressor impellers such that the input fluid in the gas phase is driven serially through all N compressor impellers; piping connecting an output of the Nth compressor impeller to the M pump impellers such that the fluid in the gas phase from the Nth compressor impeller is driven serially trough all M pump impellers after undergoing a phase change; and
   water removing devices provided between an output of a compressor or a pump impeller and an input of a next compressor or pump impeller; and at least one temperature changing device along the piping configured to reduce a temperature of the fluid in the gas or dense phase prior to entering a next compressor or pump impeller,
   wherein N is larger than two and M is equal to or larger than one.

9. The system of claim 1, further comprising six compressor impellers and eight pump impellers, wherein an input pressure at the compressor part of a CO2 in the gas phase is 1 bar and an output pressure at the pump part of the CO2 in the dense phase is between 10 and 120 bar.

10. A method for compressing a fluid in a gas phase and for pumping the fluid in a dense phase with a system including a compressor part and a pump part, the compressor part comprising at least one compressor part impeller and the pump part having at least one pump part impeller, the method comprising:
  receiving at a compressor part inlet of the compressor part the fluid in the gas phase;
  compressing the fluid in the gas phase in one or more stages of the compressor part such that the fluid emerges at a compressor part outlet of the compressor part as a fluid in the gas phase at a density equal to or larger than a predetermined density;
  transforming a phase of the fluid to the dense phase by cooling the fluid after exiting the compressor part;
  receiving the fluid in the dense phase at a pump part inlet of the pump part;
  pumping the fluid in the dense phase through one or more stages of the pump part such that the fluid emerges at a pump part outlet of the pump part having a higher pressure than at the pump part inlet; and
  rotating a single bull gear in order to activate all of the at least one or more compressor stages and the at least one or more pump stages, wherein the dense phase is defined by the fluid having a density larger than the predetermined density.

11. The method of claim 10, further comprising changing the temperature of the fluid using a temperature changing device, wherein the temperature changing device is one of a cooling device, a chiller, or an expander provided between the compressor part outlet and the pump part inlet.

12. The method of claim 11, wherein the fluid is $CO_2$, the method further comprising receiving the $CO_2$ in the compressor part in the gas phase and driving out the $CO_2$ in the gas phase, and receiving the $CO_2$ in the pump part in the dense phase and driving out the $CO_2$ in the dense phase.

13. The method of claim 11, wherein the temperature changing device is configured to reduce an enthalpy of the fluid in the gas phase to be equal to or lower than an enthalpy of a critical point of the fluid.

14. The method of claim 10, comprising driving the bull gear by a single drive mechanism.

15. The method of claim 10, wherein the compressor part and the bull gear are housed within a compressor casing and the pump part is received in a pump casing attached to the compressor casing.

16. The method of claim 10, wherein the at least one impeller of the compressor part and the at least one impeller of the pump part comprise first to sixth compressor impellers, the method further comprising:
  driving first and second compressor impellers at a same first speed, the third and fourth compressor impellers at a same second speed, and the fifth and sixth compressor impellers at a same third speed, the first, second and third speeds being different from each other and from the speed of the bull gear; and driving first to ten pump impellers at a same fourth speed by the pump shaft.

17. The method of claim 10, wherein the system comprises N compressor impellers and NI pump impellers, the method further comprising:
  connecting outputs and inputs of the N compressor impellers with piping such that the input fluid in the gas phase is driven serially through all N compressor impellers and connecting an output of the Nth compressor impeller to the M pump impellers with piping such that the fluid in the gas phase from the Nth compressor impeller is driven serially trough all Ni pump impellers after undergoing a phase change.

18. The method of claim 17 further comprising removing water with water removing devices provided between an output of a compressor or a pump impeller and an input of a next compressor or pump impeller.

19. The method of claim 18 further comprising reducing a temperature of the fluid in the gas or dense phase prior to entering a next compressor or pump impeller with at least one temperature changing device along the piping, wherein N is larger than two and M is equal to or larger than one.

20. The method of claim 10, wherein the system comprises six compressor impellers and eight pump impellers, the method further comprising inputting $CO_2$ at the compressor part at 1 bar and outputting $CO_2$ in the dense phase at the pump part between 10 and 120 bar.

* * * * *